Patented Nov. 11, 1941

2,262,430

UNITED STATES PATENT OFFICE 2,262,430

MERCURATED ALIPHATIC KETONES

Anderson W. Ralston and Miles R. McCorkle, Chicago, Ill., assignors to Armour and Company, Chicago, Ill., a corporation of Illinois No Drawing. Application November 7, 1938, Serial No. 239,410

8 Claims. (Cl. 260—431)

Organic mercurials are substances of general interest and their use as germicides and antiseptics is well known. Those organic mercurials soluble in organic solvents, such as hydrocarbons, are of particular interest.

We have now discovered a group of organic mercury-containing compounds which are oil soluble and which can be easily prepared from unsaturated aliphatic ketones. These ketones are characterized by having the structural formula RCOR' wherein R and R' are aliphatic hydrocarbon chains at least one of which contains the grouping

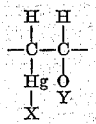

wherein X is an acid radical and Y is hydrogen or an alkyl group containing five or less carbon atoms. These compounds are generally heavy liquids or low melting solids insoluble in water but soluble in organic solvents such as ether, alcohol, kerosene or benzene. Hereinafter we shall describe weed-killing compositions containing the ketones of the present invention.

The general method for preparing our ketones consists in reacting an unsaturated aliphatic ketone having one or more double bonds with a mercuric salt in the presence of water or an aliphatic alcohol containing not more than five carbon atoms. The unsaturated aliphatic ketone starting material should have at least eleven carbon atoms in a straight-chain including the carbon atom of the carbonyl group. Thus, as starting materials, we can use any ketone having the formula RCOR wherein at least one of the alkyl groups contains a double bond. When both alkyl groups contain a double bond, as in oleone, the extent of mercuration can be controlled by the quantity of mercuric salt used. For example, Example 1 given below illustrates the introduction of one atom of mercury into the ketone and Example 2, using twice as much mercuric salt as Example 1, illustrates the introduction of two atoms of mercury into the compound, there being one atom in each of the unsaturated alkyl groups attached to the carbonyl group.

The following examples illustrate our invention.

EXAMPLE 1

9-acetoxymercuri, 10-methoxy 26-pentatriaconten-18 one 40 grams of oleone are placed in a three-necked flask equipped with a stirrer and reflux condenser, 35 grams of mercuric acetate and 150 cc. of methanol are now added and the mixture refluxed for ten hours with constant stirring. The reaction mixture is then poured into water and extracted with ether. The ether solution is then washed and dried with sodium sulfate. The solution is filtered and the ether evaporated. The product consists of 70 grams of a heavy, straw colored oil which contained 25.2% mercury. Analysis shows it to be 9-acetoxymercuri, 10-methoxy 26-pentatriaconten-18 one or its isomer. We attribute the liquid nature of the product to the possible formation of equimolar proportions of the 9-methoxy, 10-acetoxymercuri isomer during the reaction.

EXAMPLE 2

9,26-diacetoxymercuri, 10,27-dimethoxy pentatriacontan-18 one 40 grams of oleone are mixed with 70 grams of mercuric acetate and 150 cc. of methanol. The mixture is refluxed for ten hours with constant stirring in a three-necked flask equipped with a reflux condenser. The product is then treated as in Example 1. 85 grams of a heavy liquid is obtained which is 9,26-diacetoxymercuri, 10,27-dimethoxy pentatriacontan-18 one or an isomer. The mercury content is 37.2%.

EXAMPLE 3

9-chloromercuri, 10-ethoxy 26-pentatriaconten-18 one 40 grams of oleone are mixed with 30 grams of mercuric chloride and 150 cc. of ethanol and the mixture refluxed for ten hours with constant stirring. The mixture is then poured on water and extracted with ether. The ether solution is dried and the ether evaporated. 70 grams of a heavy oil are obtained which analysis shows to be 9-chloromercuri, 10-ethoxy, 26-pentatriaconten-18 one or its isomer.

EXAMPLE 4

9-methoxy, 10-acetoxymercuri nonadecan-2 one 40 grams of 9-nonadecen-2 one are placed in a three-necked flask and mixed with 20 grams of mercuric acetate and 150 cc. of methanol. The mixture is refluxed for ten hours with constant stirring. It is then treated as described under Example 1. 52 grams of a heavy liquid are obtained which is 9-methoxy, 10-acetoxymercuri nonadecan-2 one or its isomer.

EXAMPLE 5

1-acetoxymercuri, 2-methoxy 20-heneicosen-11 one 30 grams of heneicosa-1,20 diene-11 one are placed in a three-necked flask and mixed with 35 grams of mercuric acetate and 150 cc. of methanol. The mixture is refluxed for ten hours and poured on water. The water solution is extracted with ether, the ether solution dried and evaporated. 52 grams of a heavy oil are obtained which contains 33.6% mercury. Analysis indicates it to be 1-acetoxymercuri, 2-methoxy 20-heneicosen-11 one.

EXAMPLE 6

*1-chloromercuri, 2-butoxy 20-heneicosen-11 one*

30 grams of heneicosa-1,20 diene-11 one are reacted with 30 grams of mercuric chloride and 150 cc. of butyl alcohol. The mixture is heated over a steam bath for ten hours. It is then treated according to the method previously described. The product is a heavy oil containing 32.3% mercury. Analysis shows it to be 1-chloromercuri, 2-butoxy 20-heneicosen-11 one.

EXAMPLE 7

40 grams of unsaturated ketones prepared from the fatty acids of fish oil are reacted with 35 grams of mercuric acetate and 150 cc. of methanol. The mixture was treated as described under Example 1. 65 grams of a heavy oil is obtained which contains 24.1% mercury. The mercurated ketones still possess a strong fishy odor.

In the example given above all of the mercurated aliphatic ketones are characterized by the presence of the group

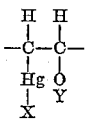

wherein X is an acid radical and Y is hydrogen or an alkyl group containing five or less carbon atoms. The general reaction for their preparation is as follows:

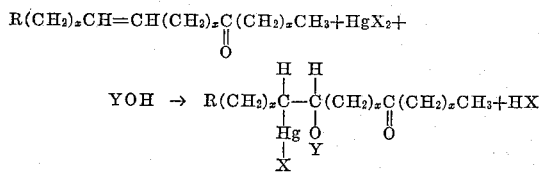

X can be any acid radical and several typical examples have been given. Thus X may be —Cl,

—NO3, etc. depending on the mercuric salt used. Y may be hydrogen or an alkyl group containing five or less carbon atoms. R is an alkyl radical. Thus if the reaction is conducted in water the group OY will be hydroxyl and if the reaction is conducted in butyl alcohol the group OY will be butoxy.

These compounds are all insoluble in water but soluble in the usual organic solvents such as ether, alcohol, acetone, kerosene, etc. They show reactions typical of ketones such as the formation of the usual ketone derivatives.

As stated above, these compounds are highly antiseptic and their use as germicides for the preparation of germicidal ointments and paints is indicated. We have further discovered that these mercurated aliphatic ketones are powerful herbicides and that they possess a preferential killing power for weeds in the presence of grass. We have found that it is possible to treat lawns containing weeds with the proper concentration of these mercurated aliphatic ketones so that the weeds are completely removed and the grass is not permanently injured. In order to accomplish this the mercurated ketone is either dissolved in a hydrocarbon solvent, such as kerosene, or emulsified and the solution or emulsion sprayed over the area to be treated. Generally we prefer to use kerosene solutions and we have found that concentrations of the order of 0.5% of the mercurated aliphatic ketone to be the most specific in its killing power. Our experimental work shows satisfactory results with concentrations ranging from 0.001% to 1.0%. Where over-all killing of plant growth is desired, higher concentrations may be employed. We have found them to be specific for the removal of weeds having milk- or latex-containing roots, such as those belonging to the family of Compsoitae which includes thistles, dandelions, sunflowers; or those belonging to the family of Asclepiadaceae which includes milkweeds. We have found them to be especially useful in the control of weeds belonging to the genus Plantago. They are also useful for the eradication and control of the so-called "crab grass," which is a serious lawn pest in most localities. It is our belief that the root systems of the weeds being more porous specifically absorb the compounds and that the absorption by the grass roots is of an entirely different order of magnitude so that when controlled amounts are sprayed, essentially all of the mercurial is absorbed by the weed roots.

Having thus described our invention, what we claim is:

1. 9-acetoxymercuri, 10-methoxy 26-pentatriaconten-18 one.
2. 9,26 - diacetoxymercuri, 10,27 - dimethoxy-pentatriacontan-18 one.
3. 9-chloromercuri, 10-ethoxy 26-pentatriaconten-18 one.
4. The process which comprises refluxing an unsaturated aliphatic ketone of relatively high molecular weight with a soluble mercuric salt of a monobasic acid in the presence of a lower aliphatic alcohol.
5. The process which comprises refluxing oleone with a mercuric salt in the presence of an aliphatic alcohol containing not more than five carbon atoms.
6. The process which comprises refluxing an unsaturated ketone containing an oleyl group with a mercuric salt in the presence of a lower aliphatic alcohol.
7. Mercurated aliphatic ketones containing a straight chain of at least eleven carbon atoms having the general formula RCOR' wherein R and R' are straight chain aliphatic hydrocarbon radicals, at least one of said radicals having one of the group consisting of hydroxy and alkyloxy containing from one to five carbon atoms attached to one carbon, and having mercury attached to an adjacent carbon and to a monobasic acid radical, the mercuric salt of which is soluble.
8. Mercurated aliphatic ketones containing thirty-five carbon atoms in a straight chain, having the general formula RCOR' wherein R and R' are straight chain aliphatic hydrocarbon radicals, at least one of said radicals having one of the group consisting of hydroxy and alkyloxy containing from one to five carbon atoms attached to one carbon, and having mercury attached to an adjacent carbon and to a monobasic acid radical, the mercuric salt of which is soluble.

ANDERSON W. RALSTON.
MILES R. McCORKLE.